United States Patent
Li et al.

(10) Patent No.: US 11,586,339 B2
(45) Date of Patent: Feb. 21, 2023

(54) ELECTRONIC DEVICE HAVING FLEXIBLE DISPLAY SCREEN AND PROCESSING METHOD THEREOF

(71) Applicant: Huawei Technologies Co., Ltd., Shenzhen (CN)

(72) Inventors: Xiaojuan Li, Beijing (CN); Wenmei Gao, Beijing (CN); Yu Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 16/312,120

(22) PCT Filed: Jun. 21, 2016

(86) PCT No.: PCT/CN2016/086630
§ 371 (c)(1),
(2) Date: Dec. 20, 2018

(87) PCT Pub. No.: WO2017/219257
PCT Pub. Date: Dec. 28, 2017

(65) Prior Publication Data
US 2019/0205011 A1    Jul. 4, 2019

(51) Int. Cl.
*G06F 3/04817* (2022.01)
*G06F 3/147* (2006.01)
(Continued)

(52) U.S. Cl.
CPC .......... *G06F 3/04817* (2013.01); *G06F 1/163* (2013.01); *G06F 1/1615* (2013.01);
(Continued)

(58) Field of Classification Search
CPC ............ G06F 3/04817; G06F 3/04845; G06F 3/0487; G06F 3/147; G06F 1/163; G06F 1/1652; G06F 1/1615; G06F 1/1618
See application file for complete search history.

(56) References Cited

U.S. PATENT DOCUMENTS 6,906,860 B2    6/2005  Starkweather
10,318,129 B2*  6/2019  Inagaki ............... G06F 3/04845
(Continued)

FOREIGN PATENT DOCUMENTS

CN    103309499 A    9/2013
CN    103501383 A    1/2014
(Continued)

OTHER PUBLICATIONS

Machine Translation and Abstract of Chinese Publication No. CN103886237, Jun. 25, 2014, 9 pages.
(Continued)

*Primary Examiner* — Cesar B Paula
*Assistant Examiner* — Sajeda Muhebbullah
(74) *Attorney, Agent, or Firm* — Conley Rose, P.C.

(57) ABSTRACT

An electronic device having a flexible display screen and a processing method thereof, where bending the electronic device may cause the electronic device to switch between a smartphone mode and a wearable mode. In the wearable mode, the electronic device displays content on a part of the flexible display screen.

19 Claims, 7 Drawing Sheets

(51) Int. Cl.
*G06F 1/16* (2006.01)
*G06F 3/04845* (2022.01)
*G06F 3/0487* (2013.01)

(52) U.S. Cl.
CPC .......... *G06F 1/1616* (2013.01); *G06F 1/1618* (2013.01); *G06F 1/1652* (2013.01); *G06F 3/0487* (2013.01); *G06F 3/04845* (2013.01); *G06F 3/147* (2013.01); *G06F 2203/04102* (2013.01); *G09G 2330/021* (2013.01); *G09G 2340/04* (2013.01); *G09G 2350/00* (2013.01); *G09G 2380/02* (2013.01)

(56) References Cited

U.S. PATENT DOCUMENTS

| | | | |
|---|---|---|---|
| 2004/0125345 | A1 | 7/2004 | Kim et al. |
| 2010/0112984 | A1 | 5/2010 | Fyke |
| 2013/0120106 | A1* | 5/2013 | Cauwels .............. A61B 5/7475 340/3.1 |
| 2013/0127918 | A1* | 5/2013 | Kang .................... G06F 3/0481 345/660 |
| 2013/0215041 | A1* | 8/2013 | Kim ...................... G06F 3/1446 345/173 |
| 2013/0321260 | A1* | 12/2013 | Joo ......................... G06F 3/041 345/156 |
| 2014/0015743 | A1* | 1/2014 | Seo ...................... G06F 1/3262 345/156 |
| 2014/0035869 | A1 | 2/2014 | Yun et al. |
| 2014/0055394 | A1* | 2/2014 | Park ........................ G06F 3/016 345/173 |
| 2014/0223343 | A1* | 8/2014 | Lee ..................... G06F 3/04817 715/765 |
| 2014/0254142 | A1 | 9/2014 | Ward |
| 2014/0302818 | A1 | 10/2014 | Fyke |
| 2014/0378113 | A1* | 12/2014 | Song ....................... G06F 1/163 455/418 |
| 2015/0185962 | A1 | 7/2015 | Lee et al. |
| 2015/0220118 | A1* | 8/2015 | Kwak ................... G06F 3/1438 345/667 |
| 2015/0220119 | A1 | 8/2015 | Seo et al. |
| 2016/0240154 | A1* | 8/2016 | Forutanpour ........ G09G 3/3644 |
| 2016/0284210 | A1* | 9/2016 | Wang .................... G08C 17/02 |
| 2016/0299592 | A1 | 10/2016 | Kim |
| 2017/0011210 | A1* | 1/2017 | Cheong .................. H04W 4/00 |
| 2017/0186400 | A1 | 6/2017 | Song et al. |
| 2018/0128654 | A1 | 5/2018 | Wang |

FOREIGN PATENT DOCUMENTS

| | | |
|---|---|---|
| CN | 103886237 A | 6/2014 |
| CN | 203721163 U | 7/2014 |
| CN | 104423553 A | 3/2015 |
| CN | 104520788 A | 4/2015 |
| CN | 104737100 A | 6/2015 |
| CN | 104848798 A | 8/2015 |
| CN | 104933964 A | 9/2015 |
| CN | 105373364 A | 3/2016 |
| JP | 2011027822 A | 2/2011 |
| JP | 5290078 B2 | 9/2013 |

OTHER PUBLICATIONS

Machine Translation and Abstract of Chinese Publication No. CN105373364, Mar. 2, 2016, 15 pages.
Machine Translation and Abstract of Chinese Publication No. CN203721163, Jul. 16, 2014, 12 pages.
Machine Translation and Abstract of Japanese Publication No. JP2011027822, Feb. 10, 2011, 30 pages.
Foreign Communication From A Counterpart Application, PCT Application No. PCT/CN2016/086630, English Translation of International Search Report dated Mar. 15, 2017, 2 pages.
Foreign Communication From A Counterpart Application, PCT Application No. PCT/CN2016/086630, English Translation of Written Opinion dated Mar. 15, 2017, 4 pages.
Machine Translation and Abstract of Japanese Publication No. JP5290078, Sep. 18, 2013, 30 pages.
Foreign Communication From A Counterpart Application, Chinese Application No. 201680036061.0, May 8, 2019, 9 pages.
Machine Translation and Abstract of Chinese Publication No. CN103501383, Jan. 8, 2014, 16 pages.
Machine Translation and Abstract of Chinese Publication No. CN104423553, Mar. 18, 2015, 19 pages.

* cited by examiner

ELECTRONIC DEVICE HAVING FLEXIBLE DISPLAY SCREEN AND PROCESSING METHOD THEREOF

CROSS-REFERENCE TO RELATED APPLICATIONS

This application is a U.S. National Stage of International Patent Application No. PCT/CN2016/086630 filed on Jun. 21, 2016, which is hereby incorporated by reference in its entirety.

TECHNICAL FIELD

The present invention relates to the communications field, and in particular, to an electronic device having a flexible display screen and a processing method thereof.

BACKGROUND

Different from a flat-panel display, a flexible display screen is a display screen that is flexible, bendable, foldable, or can be rolled up without obvious damage, and the display screen is made of a thin flexible substrate. In recent years, with development of new material technologies, applying a flexible display screen to an electronic device has come true. The flexible display screen may be used in various application fields, for example, in e-paper, an e-book, a television, a computer, a personal digital assistant, an in-vehicle display, a tablet computer, a smartphone, and a wearable device.

As electronic devices are increasingly diversified, a user usually needs to carry multiple electronic devices to adapt to different application scenarios. For example, the user needs to carry both a smartphone and a smart watch sometimes. There are inconvenience and disadvantages in actual use, and therefore, improvements are required.

SUMMARY

In view of the foregoing technical problems, objectives of the present invention are to provide an electronic device having a flexible display screen and a processing method thereof to further expand a screen of a wearable device such as a smart watch or a smart band while ensuring portability of a large-screen smartphone, so that an electronic device having a flexible display screen can switch between a smartphone mode and a wearable mode, thereby improving user experience greatly.

The term "bending" mentioned hereinafter in the present invention includes but is not limited to deforming, flex, bending, curling, folding, buckling, roll-up, and the like.

The term "wearable mode" mentioned hereinafter in the present invention is a working mode when the electronic device is used as a wearable device. When the electronic device is in the wearable mode, the electronic device has a common function of the wearable device, and may be worn on a body of a user, or may be integrated into a garment or a garment accessory of the user.

The term "smartphone mode" mentioned hereinafter in the present invention is a working mode when the electronic device is used as a smartphone or a tablet computer. When the electronic device is in the smartphone mode, the electronic device has a common function of the smartphone or the tablet computer.

The term "electronic device" mentioned hereinafter in the present invention is a portable communications device that may include other functions such as a personal digital assistant (PDA) and/or portable multimedia player (PMP) function, for example, e-paper, an e-book, an in-vehicle display, a tablet computer, a smartphone, a smart watch, or a smart band. Examples of embodiments of portable electronic devices include but are not limited to portable electronic devices installed with iOS®, Android®, Windows Phone®, or other operating systems.

The electronic device generally supports multiple application programs, such as one or more of the following: a drawing application program, a presentation application program, a text processing application program, a web page creating application program, a disk editing application program, a spreadsheet application program, a game application program, a phone application program, a videoconferencing application program, an e-mail application program, an instant messaging application program, an exercise support application program, a photo management application program, a digital camera application program, a digital video camera application program, a web browsing application program, a digital music player application program, and/or a digital video player application program.

According to a first aspect, a method is provided and applied to an electronic device having a flexible display screen, and includes: displaying icons of n applications on the flexible display screen that is not bent, where n is an integer greater than 1, and the electronic device is in a smartphone mode; and when detecting that a central area of the flexible display screen protrudes and that a distance between upper and lower ends of the flexible display screen is less than a preset value, switching the electronic device to a wearable mode, and displaying icons of m applications in a specified area of the flexible display screen, where the specified area is a part of the flexible display screen, the specified area has an upper edge, a lower edge, a left edge, and a right edge, the upper edge is separated from the lower edge by a predetermined distance, a bending line is located between the upper edge and the lower edge and distances from the upper edge and the lower edge to the bending line are equal, the left and right edges are left and right boundaries of the flexible display screen respectively, the bending line is a straight line that connects points at which maximum bending occurs in a bending area, and m is an integer not greater than n. According to the foregoing method, switching between the smartphone mode and the wearable mode can be implemented, and one device carried by a user can implement multiple functions.

In a possible design, sizes of the icons of the m applications are smaller than sizes of the icons of the n applications. When the electronic device is in the wearable mode, the sizes of the application icons adapt to a reduced display size.

In a possible design, the m applications include a first application and a second application, and a size of an icon of the first application is greater than a size of an icon of the second application. A size of an icon of a frequently used application in the wearable mode is increased, so that the user can operate the frequently used application easily.

In a possible design, the m applications include a first application and a second application, a size of an icon of the first application is greater than sizes of the icons of the n applications, and a size of an icon of the second application is not greater than the sizes of the icons of the n applications. According to a display area in the wearable mode, sizes of some application icons are increased, so that the application icons are clearer and more visible than those in the smartphone mode.

In a possible design, areas other than the specified area on the flexible display screen are closed. This can reduce power consumption of the electronic device and prolong a standby time.

According to a second aspect, an electronic device is provided, where the electronic device includes units configured to perform the method according to any one of the first aspect or possible implementations of the first aspect.

According to a third aspect, a computer readable storage medium storing one or more programs is provided, where the one or more programs include an instruction, and when the instruction is executed by an electronic device, the electronic device performs the method according to any one of the first aspect or possible implementations of the first aspect.

According to a fourth aspect, an electronic device is provided, where the electronic device may include one or more processors, a memory, a display, a bus system, a transceiver, and one or more programs, where the processor, the memory, the display, and the transceiver are connected by the bus system, and the display includes a flexible display screen, where the one or more programs are stored in the memory, the one or more programs include an instruction, and when the instruction is executed by the electronic device, the electronic device performs the method according to any one of the first aspect or possible implementations of the first aspect.

According to a fifth aspect, a graphical user interface on an electronic device is provided, where the electronic device includes a memory, multiple applications, and one or more processors configured to execute one or more programs stored in the memory, and the graphical user interface includes a user interface displayed in the method according to any one of the first aspect or possible implementations of the first aspect.

Optionally, the following possible designs may be combined with the first aspect to the fifth aspect of the present invention.

In a possible design, a first profile is used when the electronic device is in the smartphone mode, and a second profile is used when the electronic device is in the wearable mode. The user may quickly achieve a mute or vibration effect by bending the electronic device.

In a possible design, when the electronic device switches to the wearable mode, a function interface of a specific application is displayed in a specified area of the flexible display screen, where the specific application includes at least one or any combination of a clock, a pedometer, a heart rate meter, health, reminders, information, phone, or an altitude table. In the wearable mode, applications frequently used on the wearable device may be directly displayed, and tap operations of the user are reduced.

In a possible design, when the electronic device switches to the wearable mode, the electronic device performs a specific operation on an application that currently runs, and the specific operation includes adjusting volume or closing the application. The user can quickly close or start the specific application by bending the electronic device.

In a possible design, when detecting that the central area of the flexible display screen sinks and that the distance between the upper and lower ends of the flexible display screen is greater than the preset value, the electronic device switches to the smartphone mode.

According to the foregoing technical solutions, switching of the electronic device between the smartphone mode and the wearable mode can be implemented.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, ordinal numbers such as "first" and "second", when mentioned in the embodiments of the present invention, are used only for distinguishing, unless the ordinal numbers definitely represent an order according to the context.

Figure 1:
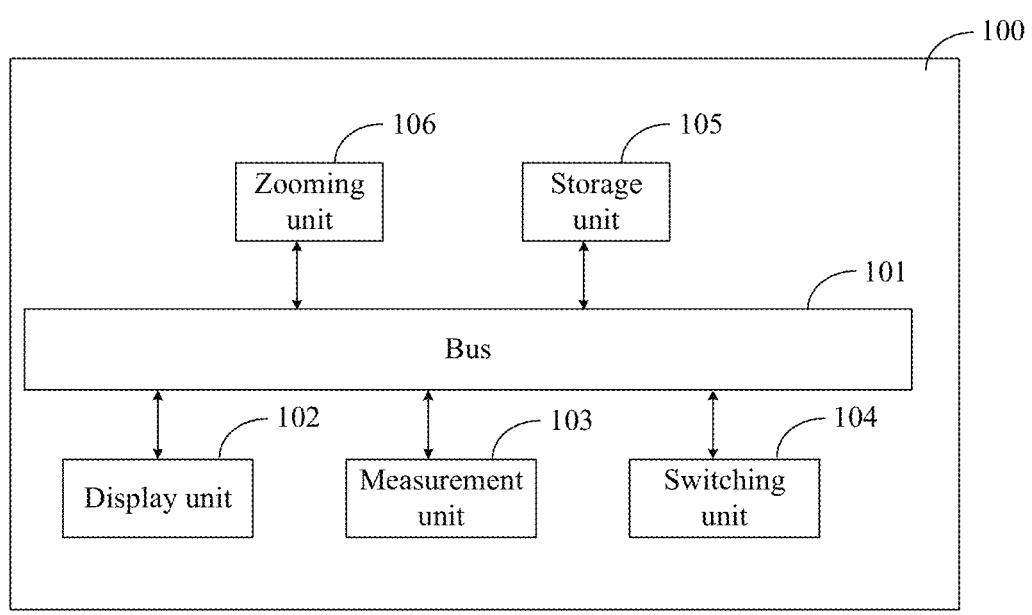
FIG. 1 is a block diagram of an electronic device according to an embodiment of the present invention.

FIG. 1 is a block diagram of an electronic device 100 according to an example of an embodiment of the present invention. As shown in FIG. 1, the electronic device 100 includes a display unit 102, a measurement unit 103, a switching unit 104, a storage unit 105, and a zooming unit 106 that are coupled with a bus 101. FIG. 1 shows the electronic device 100 having various components. However, it should be understood that, an implementation of the electronic device 100 does not necessarily require all the components shown in the figure. The electronic device 100 may be implemented by using more or fewer components. In the present invention, the electronic device 100 has a flexible display screen 110.

The following explains each of the foregoing components.

The flexible display screen 110 has a bendable structure and can be made of a material that can be bent. The flexible display screen 110 is an apparatus that can be bent, crooked (crook), folded, or rolled up like paper and has a display feature of a non-flexible flat-panel display apparatus. The flexible display screen 110 is optionally formed by a flexible substrate, a driver, a display panel, and a protective layer. The flexible display screen 110 may be manufactured on the flexible substrate. Specifically, the flexible substrate may be implemented by using plastic deformed by external pressure (for example, a polymer film).

The flexible substrate implemented by using plastic has such a structure: The structure is formed by applying a protective coating to an opposite surface of a base film. The base film may be implemented by using various resins. For example, the resins may be polyimide (polyimide, PI), polycarbonate (polycarbonate, PC), polyethyleneterephtalate (polyethyleneterephtalate, PET), polyethersulfone (polyethersulfone, PES), polythylenenaphthalate (polythylenenaphthalate, PEN), and fiber reinforced plastic (fiber reinforced plastic, FRP).

The flexible substrate may also be formed by another flexible material instead of plastic. The another flexible material may be, for example, thin glass or metal foil.

The driver drives the display panel of the flexible display screen 110. Specifically, the driver applies drive voltage to multiple pixels of the display panel, and may be implemented by using a silicon TFT, a low temperature polysilicon (LTPS) TFT, or an organic TFT (OTFT). The driver may also be implemented in various forms according to forms of the display panel. For example, the display panel may be formed by an organic light emitting material that includes multiple pixel units and an electrode layer of an opposite surface that covers the organic light emitting material. In this case, the driver may include multiple transistors corresponding to the multiple pixel units of the display panel. The controller applies an electrical signal to a gate of each transistor, and controls a pixel unit connected to the transistor to emit light, thereby implementing image displaying.

In addition to an organic light-emitting diode (OLED), the display panel may be implemented, for example, by using an electroluminescence display (EL), an electrophoretic display (EPD), an electrochromic display (ECD), a liquid crystal display (LCD), an active-matrix LCD (AMLCD), or a plasma display panel (PDP).

In addition to the foregoing structure, the flexible display screen 110 may be implemented by using e-paper (e-paper). The e-paper may change a picture or a text by using a twisting ball or encapsulated electrophoretic.

If the flexible display screen 110 is formed by components of transparent materials, the flexible display screen 110 may be implemented as a flexible transparent display apparatus.

The flexible display screen 110 has at least one display surface, that is, the flexible display screen may perform displaying on two opposite surfaces.

According to configurations of the electronic device 100, the flexible display screen may be implemented by using two or more display screens. For example, multiple display screens may be integrated or separately disposed on one surface, or disposed on different surfaces.

In addition, the electronic device 100 including the flexible display screen 110 according to the example of the embodiment may include a housing not shown in the figure, and the housing encloses the flexible display screen. Considering the feature of the flexible display screen, the housing may be configured in such a manner that the housing can be bent together with the flexible display screen by external force.

The display unit 102 may display information processed in the electronic device 100. For example, when the electronic device 100 is in a phone call mode, the display unit 102 may display a user interface (UI) or a graphical user interface (GUI) associated with a call.

Particularly, the display unit 102 is configured to display icons of n applications on the flexible display screen 110 that is not bent when the electronic device 100 is in a smartphone mode, where n is an integer greater than 1. The display unit 102 is further configured to display icons of m applications in a specified area of the flexible display screen 110 when the electronic device is in a wearable mode. The specified area is determined according to a bending line (described in detail hereinafter). The specified area may be all display areas of the flexible display screen 110, or may be a part of all display areas of the flexible display screen.

Content displayed in the specified area may be an image, an application icon, a function interface of an application, or the like.

The bending line is a straight line that connects points at which maximum bending occurs in a bending area, and m is an integer less than or equal to n.

The measurement unit 103 is configured to measure bend information of the flexible display screen 110. The bend information of the flexible display screen 110 may include various information that can be sensed due to bending of the flexible display screen 110. Specifically, the measurement unit 103 may recognize a bending/folding position, a bending/folding direction, a bending/folding angle, a bending/folding degree, a bending/folding speed, a quantity of bending/folding times, a time at which bending/folding occurs, and a time of keeping bending/folding. The measurement unit 103 may include a bend sensor or a pressure sensor (discussed in detail hereinafter).

Optionally, the measurement unit 103 is formed by one or more sensor components. The one or more sensor components may be a pressure sensor, an infrared sensor, an ultrasonic sensor, an electromagnetic field sensor, a capacitive sensor, a touch sensor, and a proximity sensor. The multiple types of sensors may be combined in any way according to a requirement, provided that an objective of measuring bend information can be achieved. The one or more sensor components may be disposed on an upper surface and/or a lower surface of the flexible display screen 110. As an example of sensors, the measurement unit 103 may be formed by multiple strain gauges separately disposed on the upper and lower surfaces of the screen.

In the present invention, the bending line is a point at which maximum bending occurs in the bending area. When the bend sensor is implemented by multiple strain gauges that are separated from each other, a bending point is indicated by a point at which each strain gauge is located. The bending line is a virtual line formed by connecting points at which strain gauges output maximum resistance values.

The measurement unit 103 may recognize a bending degree according to distribution of resistance values output by the bend sensor or a change of pressure sensed by the pressure sensor. The bending degree may be further indicated by a degree of proximity between two edges of the flexible display screen due to bending. For example, the measurement unit 103 may measure a distance between upper and lower ends of the flexible display screen, thereby recognizing the bending degree of the flexible display screen 110.

The measurement unit 103 may sense a change of a bending status. Specifically, the measurement unit 103 may recognize a change of the bending/folding position, a change of the bending/folding direction, a change of the bending/folding angle, and a change of the bending/folding degree.

The switching unit 104 switches a working mode of the electronic device 100 based on the bend sensed by the measurement unit 103. For example, if a bending/folding operation sensed by the measurement unit 103 meets a predetermined condition, the switching unit 104 may switch the electronic device 100 from the smartphone mode to the wearable mode, or switch the electronic device 100 from the wearable mode to the smartphone mode.

The storage unit 105 is configured to store various working modes of the electronic device 100, and content related to the working modes. The content related to the working modes includes content displayed on the flexible display screen, a specific operation performed on an application, profile information, and the like.

For example, a first profile is used when the electronic device 100 is in the smartphone mode, and a second profile is used when the electronic device 100 is in the wearable mode. Information about the first profile and information about the second profile are separately stored in the storage unit 105. In the first profile, an incoming call notification uses a ringtone 1 of first volume, a new SMS message uses a ringtone 2 of second volume, and an alert tone uses a ringtone 3 of third volume. In the second profile, an incoming call notification uses vibration 1 of first vibration strength, a new SMS message uses vibration 2 of second vibration strength, and an alert tone uses vibration 3 of third vibration strength.

It may be understood that, the foregoing descriptions about the first and second profiles are only examples. The first profile and the second profile may respectively include a combination of volume and/or vibration strength. For example, the first profile may be: an incoming call notification uses a ringtone 1 of first volume and vibration 1 of first vibration strength, a new SMS message uses vibration 2 of second vibration strength, and an alert tone uses a ringtone 3 of third volume. The first and second profiles have multiple implementations known by a person skilled in the art. Details are not further described herein.

The storage unit 105 may store a software program executed by a processor described hereinafter to process and control operations, or may temporarily store input or output data (for example, a phone book, a message, a still image, or a video).

An appropriate storage medium of any type may be used to implement the storage unit 105. The storage medium includes a flash memory, a hard disk, a micro multimedia card, a memory card (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In addition, the electronic device 100 may perform operations related to a network storage apparatus that performs a storage function of the storage unit 105 on the Internet.

The zooming unit 106 is configured to zoom out or zoom in an application icon. For example, the zooming unit zooms out an application icon displayed in the wearable mode, so that a size of the application icon adapts to a display size in the wearable mode.

In the wearable mode, the electronic device 100 is used as a wearable device such as a smart watch or a smart band. In this case, the display unit 102 displays an application icon related to the wearable device. The application icon related to the wearable device includes but is not limited to: a pedometer, a heart rate meter, a clock, health, an altitude table, sleep statistics, or the like.

The electronic device 100 further includes a processor. The processor is a control center of the electronic device 100, and provides sorting and processing facilities to execute an instruction, perform an interrupt operation, and provide a timing function and lots of other functions. Optionally, the processor includes one or more central processing units (CPU). Optionally, the electronic device 100 includes more than one processor. The processor may be a single-core (single CPU) processor or a multi-core (multi-CPU) processor. The term "processor" used in this specification denotes one or more devices, circuits, and/or processing cores that are used for processing a computer program instruction.

The processor may execute program code stored in a data storage apparatus. Optionally, the program code stored in a storage medium of the data storage apparatus may be copied to the storage unit for execution by the processor.

The electronic device 100 further includes a control unit, configured to close a part or an entirety of the flexible display screen. For example, when the electronic device is in the wearable mode, the control unit may close areas other than the specified area on the flexible display screen.

The electronic device 100 further includes a communications interface, configured to communicate with another device or system directly or by using an external network.

Optionally, the electronic device 100 further includes an input device (not shown in the figure). The input device is coupled with the processor, and can receive an input of a user in one or more manners. Examples of the input device include a mouse, a keyboard, a touchscreen device, a sensing device, and the like.

The foregoing components of the electronic device 100 may be mutually coupled by using any one or any combination of buses 301 such as a data bus, an address bus, a control bus, an extended bus, or a local bus.

Each implementation described in the specification may be implemented in a computer readable medium or another similar medium by using software, hardware, or any combination thereof.

For a hardware implementation, the embodiment described herein may be implemented by using at least one of an application-specific integrated circuit (ASIC), a digital signal processor (DSP), a digital signal processing device (DSPD), a programmable logic device (PLD), a field programmable gate array (FPGA), a central processing unit (CPU), a general purpose processor, a microprocessor, or an electronic unit that is designed to perform the functions described herein. In some cases, this embodiment may be implemented by the processor itself.

For a software implementation, an embodiment of a program or a function or the like described herein may be implemented by a separate software module. Each software module may perform one or more functions or operations described herein.

A software application compiled in any appropriate programming language can implement software code. The software code may be stored in the storage unit and executed by the processor.

Figure 2:
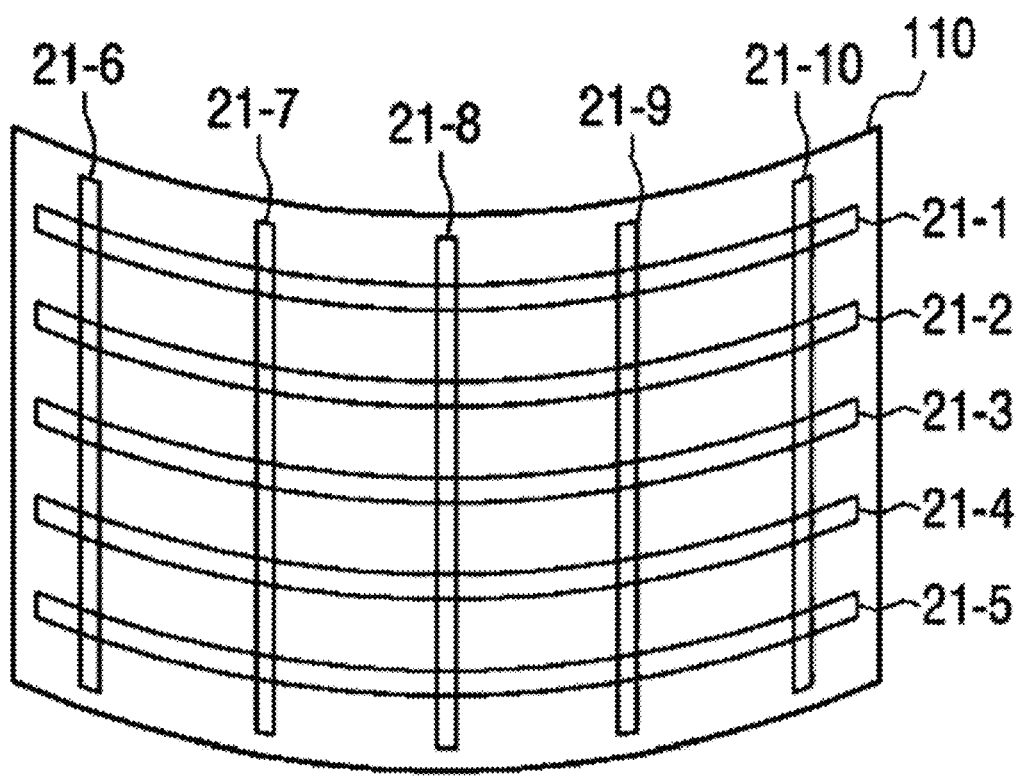
FIG. 2 is a schematic diagram for sensing bend information of a flexible display screen according to an embodiment of the present invention.

FIG. 2 is a schematic diagram for sensing bend information of a flexible display screen according to an example of an embodiment.

The flexible display screen 110 may be bent by external pressure, and its shape can be changed. The term "bending (bending)" includes normal bending, folding, and roll-up. "Normal bending" indicates a state in which the flexible display screen is bent along a line. "Folding" indicates a state in which the flexible display screen is folded along a line. Folding and normal bending may be distinguished by a bending degree. For example, if the bending is greater than a predetermined bending angle, the bending is referred to as folding, and if the bending is less than the predetermined bending angle, the bending is referred to as normal bending.

"Roll-up" indicates a state in which the flexible display screen is rolled up. The roll-up may also be determined based on a bending angle. For example, if bending greater than the predetermined bending angle is sensed in a predetermined area, the bending is defined as roll-up. In addition to the bending angle, normal bending, folding, and roll-up may be determined based on a curvature radius.

As described above, a measurement unit 103 is formed by one or more sensor components, and bending of the flexible display screen 110 is sensed in various manners by using the one or more sensor components.

For example, the measurement unit 103 may include a bend sensor 21 disposed on a surface (for example, a front surface or a rear surface of the flexible display screen 110), or bend sensors 21 disposed on two opposite surfaces of the flexible display screen 110.

The bend sensor 21 is a sensor that is bendable and has a resistance value that changes according to a bending degree. The bend sensor 21 may be implemented by using a component such as an optical fiber bend sensor, a pressure sensor, or a strain gauge.

The shapes, quantity, and locations of the bend sensors 21 may be changed in various manners. For example, the flexible display screen 110 may include a single bend sensor or multiple bend sensors that are interconnected.

FIG. 2 shows an example of multiple strip-shaped bend sensors 21 disposed in a grid pattern in a vertical direction and a horizontal direction.

Referring to FIG. 2, the measurement unit 103 includes bend sensors 21-1 to 21-5 disposed in a first direction, and bend sensors 21-6 to 21-10 disposed in a second direction vertical to the first direction. The disposed bend sensors 21 are separated from each other by a predetermined distance.

In FIG. 2, five bend sensors (21-1 to 21-5, or 21-6 to 21-10) are disposed in either of the horizontal direction and the vertical direction to form a grid structure layout. However, this is merely an example, and the quantity of the bend sensors 21 may be changed according to a size of the flexible display screen 110. The bend sensors 21 are disposed in the horizontal direction and the vertical direction to sense bending of an entire area of the flexible display screen 110. Therefore, if only a part of the flexible display screen 110 is flexible or if bending of only a part of the flexible display screen 110 needs to be sensed, the bend sensor 21 may be disposed only in a corresponding part of the flexible display screen 110.

As shown in FIG. 2, if the flexible display screen 110 is bent, causing a central area (relative to a left edge and a right edge) of the flexible display screen 110 to move downward, tension caused by the bending is applied to the bend sensors 21-1 to 21-5 that are arranged along the horizontal direction. Therefore, a resistance value of each of the bend sensors 21-1 to 21-5 that are arranged along the horizontal direction is changed. The measurement unit 103 senses a change of an output value of each output in the bend sensors 21-1 to 21-5, and therefore determines that the center of the surface of the display screen is bent in the horizontal direction. In FIG. 2, the central area is bent in a downward direction (referred to as a Z− direction hereinafter) vertical to the surface of the display screen. However, even if the central area is bent in an upward direction (referred to as a Z+ direction hereinafter) using the surface of the display screen for reference, bending may also be sensed based on changes of output values of the bend sensors 21-1 to 21-5 that are arranged along the horizontal direction.

Likewise, if the flexible display screen 110 is bent, causing the central area (relative to an upper edge and a lower edge) of the flexible display screen 110 to move upward, tension is applied to the bend sensors 21-6 to 21-10 that are arranged along the vertical direction. The measurement unit 103 may sense deformation of the shape in the vertical direction based on output values of the bend sensors 21-6 to 21-10 that are arranged along the vertical direction.

If deformation of the shape occurs in a diagonal direction, tension is applied to all bend sensors 21 that are arranged in the horizontal direction and the vertical direction. Therefore, based on the output values of the bend sensors 21 that are arranged in the horizontal direction and the vertical direction, deformation of the shape in the diagonal direction may be sensed.

Figure 3:
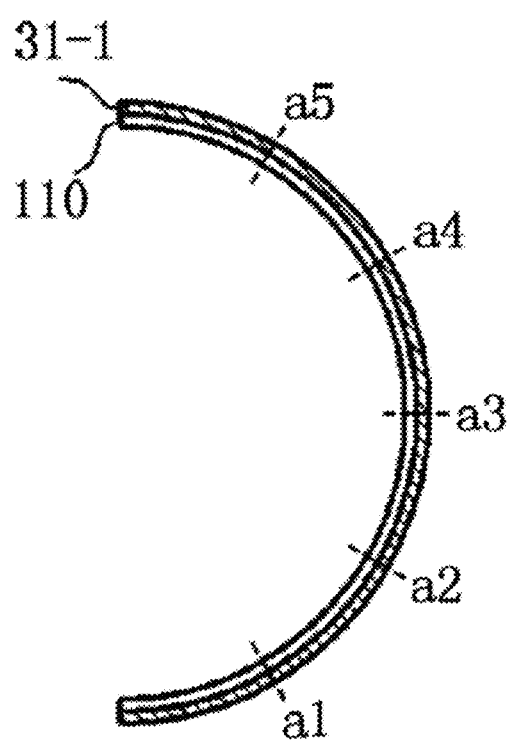
FIG. 3 is a cutaway drawing when a flexible display screen is bent according to an embodiment of the present invention.

FIG. 3 is a cutaway drawing when a flexible display screen 110 is bent.

A bend sensor 31-1 is disposed on an upper surface (or a front surface) of the flexible display screen 110, and the upper surface (or the front surface) is a surface of the flexible display screen 110 that faces a user.

The term "protruding" used in the present invention means protruding upward (or forward) in a direction using the surface of the display screen for reference. Specifically, as shown in FIG. 3, a part in which a point a5 is located is an upper end of the flexible display screen, and a part in which a point a1 is located is a lower end of the flexible display screen. When a central area (an area in which a point a3 is located) of the flexible display screen protrudes, relative to the upper end and the lower end of the flexible display screen, the central area is closer to eyes of the user. In this case, when the central area of the flexible display screen protrudes, the upper end and the lower end of the flexible display screen approach each other.

Correspondingly, when the central area of the flexible display screen sinks, relative to the upper end and the lower end of the flexible display screen, the central area is far away from the eyes of the user.

The screen upper end and lower end of the flexible display screen 110 described in the present invention denote only two ends of an electronic device 100 that are away from the ground in different heights, where an end that is relatively far away from the ground is the upper end, and an end that is relatively close to the ground is the lower end. For example, the screen upper end of the flexible display screen 110 may be an end of a smartphone at which a camera is installed (an upper end in a normal sense), or may be an end of a smartphone at which a microphone is located (a lower end in a normal sense). The screen upper end of the flexible display screen 110 may also be any end of four edges of the smartphone.

When the flexible display screen 110 is bent, a bend sensor 31 arranged on a surface or an opposite surface of the flexible display screen 110 is also bent, and has a resistance value corresponding to a value of applied tension, and outputs a value corresponding to the resistance value.

For example, if the center of the flexible display screen 110 is bent and protrudes as shown in FIG. 3, the bend sensor 31-1 disposed on the upper surface of the flexible display screen 110 is also bent, and outputs a resistance value according to a value of applied tension.

In this case, the value of the tension increases in proportion to a bending degree. If the bending occurs as shown in FIG. 3, maximum bending occurs in the central area. Therefore, maximum tension is applied to the bend sensor 31-1 disposed at the point a3 that is used as the central area. Therefore, the bend sensor 31-1 has a maximum resistance value. On the other hand, the bending degree decreases gradually in an outward direction. Therefore, as distances from the point a3 to points a2 and a1 or to points a4 and a5 increase, the resistance value of the bend sensor 31-1 becomes smaller.

If the resistance value output by the bend sensor 31 is maximum at a specific point and decreases gradually along a reverse direction, the measurement unit 103 may determine that an area in which a maximum resistance value is sensed is bent most severely.

Figure 4:
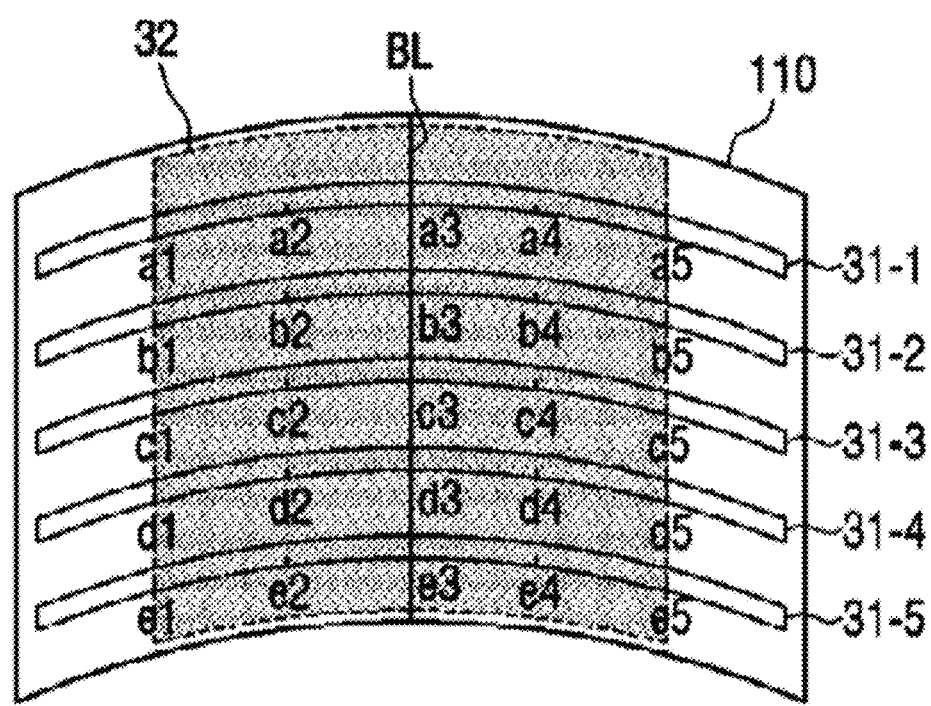
FIG. 4 is a schematic diagram of a method for defining a bending area according to an embodiment of the present invention.

FIG. 4 is a schematic diagram of a method for defining a bending area in an example of an embodiment according to a general conception of the present invention. FIG. 4 is a view showing a case in which a flexible display screen 110 is bent in a horizontal direction using a front surface for reference. Therefore, for ease of description, a bend sensor 31 arranged in a vertical direction is not illustrated. Although different reference numbers are used for the bend sensors 31 in each accompany drawing, the bend sensors 21 shown in FIG. 2 may be used, as shown in FIG. 2.

The bending area is an area in which the flexible display screen 110 is bent. A bend sensor 31 is also bent when the flexible display screen 110 is bent. Therefore, all points at which a bend sensor 31 outputs resistance values different from original values may be defined as a bending area.

A measurement unit 103 may sense, based on a relationship between points at which changes of resistance values are sensed, a size of a bending line BL, a direction of the bending line BL, a location of the bending line BL, a quantity of bending lines BLs, a quantity of bending times, a bending speed in shape deformation, a size of the bending area, a location of the bending area, and a quantity of bending areas.

Specifically, if a distance between points at which changes of resistance values are sensed is less than a predetermined distance, the points are sensed as a bending area. On the other hand, if a distance between points at which changes of resistance values are sensed exceeds a predetermined distance, different bending areas are defined with respect to the points.

FIG. 4 is a view showing a method for sensing a bending area. If the flexible display screen 100 is bent as shown in FIG. 4, resistance values of points a1 to a5 of a bend sensor 31-1, points b1 to b5 of a bend sensor 31-2, points c1 to c5 of a bend sensor 31-3, points d1 to d5 of a bend sensor 31-4, and points e1 to e5 of a bend sensor 31-5 are different from resistance values of the points in original states.

In this case, the points at which changes of resistance values are sensed in each of the bend sensors 31-1 to 31-5 are located in the predetermined distance, and are arranged continuously.

Therefore, the measurement unit 103 senses an area 32 as a bending area. The area 32 includes all of the points a1 to a5 of the bend sensor 31-1, the points b1 to b5 of the bend sensor 31-2, the points c1 to c5 of the bend sensor 31-3, the points d1 to d5 of the bend sensor 31-4, and the points e1 to e5 of the bend sensor 31-5.

The bending area may include a bending line BL. The bending line BL is a line that connects different points at which maximum resistance values are output from the bend sensor 31. That is, in each bending area, a line that connects points at which maximum resistance values are sensed is defined as a bending line BL.

For example, in the case in FIG. 4, a bending line BL is defined in the bending area 32, and the bending line connects points a3, b3, c3, d3, and e3. These points are points at which maximum resistance values are output from the bend sensors 31-1, 31-2, 31-3, 31-4, and 31-5 respectively. FIG. 4 shows a bending line BL formed in the vertical direction (Z− or Z+) in the central area of the flexible display screen.

The bending direction of the flexible display screen 110 may be sensed in various manners. For example, two bend sensors may be disposed in such a manner that one is located on the other, and the bending direction is determined based on a difference of changes of resistance values of each bend sensor.

Two bend sensors may be disposed on one side of the flexible display screen 110 and overlap each other. In this case, if bending is performed in one direction, different resistance values are output from an upper sensor and a lower sensor 61-2 at a point at which bending is performed. Therefore, the bending direction is determined by comparing resistance values of two bend sensors at the same point.

Specifically, if the flexible display screen 110 is bent in a Z− direction, tension applied to the upper sensor is greater than tension applied to the lower sensor.

On the other hand, if the flexible display screen 100 is bent in a Z+ direction, at a point corresponding to the bending line BL, tension applied to the lower sensor is greater than tension applied to the upper sensor.

Two bend sensors may be disposed on one side of the flexible display screen and overlap each other. However, the bend sensors may also be disposed on two opposite surfaces of the flexible display screen.

In this case, when the flexible display screen is bent, a bend sensor on one surface receives compressive force, but a bend sensor on the other surface receives tension. Different values are detected from the bend sensors on the two surfaces according to a bending direction. Therefore, the bending direction may be determined.

Although a linear bend sensor is used in the examples of the embodiments shown in FIG. 2 to FIG. 4, multiple separate strain gauges may also be used to sense bending.

Each strain gauge is made of a metal or semiconducting material. When the strain gauge is mechanically deformed by external force, a resistance value of the strain gauge is changed correspondingly. For example, a resistance value of a strain gauge made of a metal material increases when the strain gauge is stretched by external force, but the resistance value decreases when the strain gauge shrinks. Therefore, whether a surface of the flexible display screen in which a strain gauge is embedded is bent may be determined by measuring a change of the resistance value.

In addition to the various sensors described above, the measurement unit 103 may use a touch sensor to sense whether two relative edges of the flexible display screen touch each other due to bending. The measurement unit 103 may also use a proximity sensor to sense whether the edges approach each other due to bending, and areas approaching each other do not touch each other.

In addition to the foregoing examples of the embodiments, the flexible display screen may use various sensors to sense the bending direction. The various sensors may be, for example, a gyroscope sensor, a geomagnetic sensor, and an acceleration sensor.

As described above, the flexible display screen may use various sensors to sense bending. The method for arranging sensors and the sensing method may be applied to the flexible display screen 110 separately, or may be applied to the flexible display screen 110 in combination.

Figure 5:
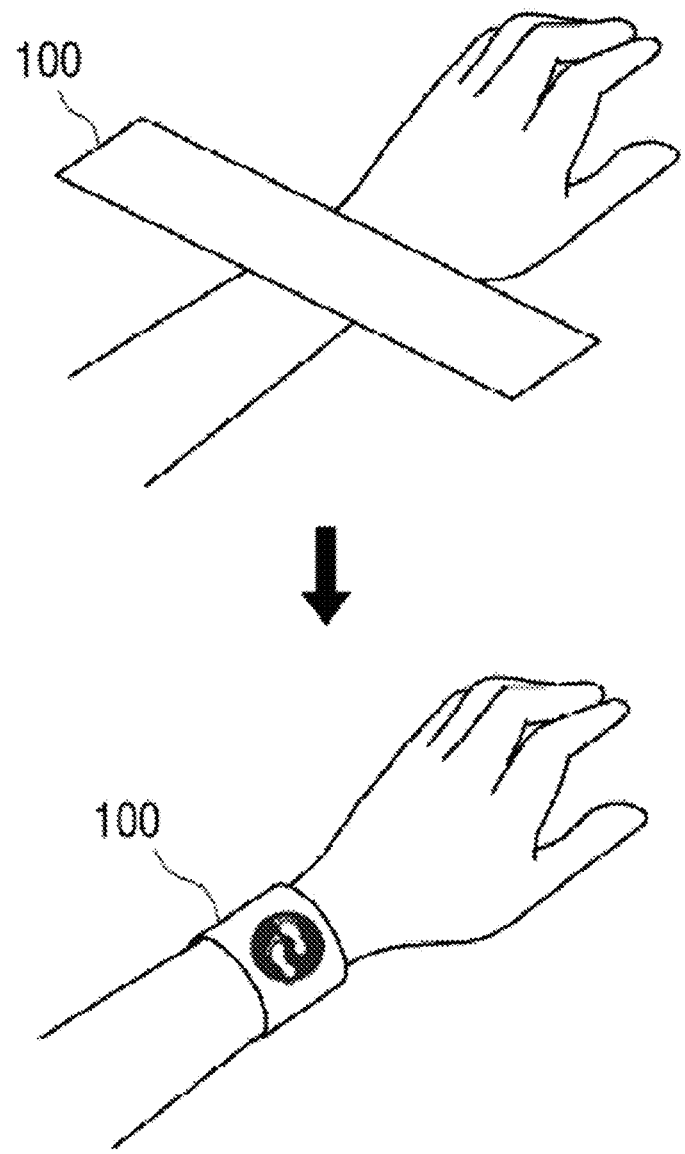
FIG. 5 is a schematic diagram of switching between a smartphone mode and a wearable mode according to an embodiment of the present invention.

FIG. 5 is a schematic diagram of switching between a smartphone mode and a wearable mode in an example of an embodiment according to a general conception of the present invention.

Based on bend information of a flexible display screen 110 that is sensed by a measurement unit 103, a processor may change information displayed on the flexible display screen 110 or generate a control signal used for controlling an electronic device 100.

As shown in FIG. 5, when the flexible display screen 110 of the electronic device 100 is bent in a manner in which a central area protrudes, the measurement unit 103 senses a distance between an upper end and a lower end of the flexible display screen. When the distance between the upper end and the lower end is less than a preset value, a switching unit 104 switches the electronic device 100 from the smartphone mode to the wearable mode, and the electronic device 100 is used as a wearable device in the wearable mode, such as a smart watch or a smart band. In this case, the flexible display screen 110 displays an application icon related to the wearable device, and the application icon related to the wearable device includes but is not limited to: a pedometer, a heart rate meter, a clock, health, an altitude table, sleep statistics, or the like. As shown in FIG. 5, the electronic device 100 is bent to form a smart band. In this case, the displayed application icon is a pedometer.

A value range of the preset value of the distance between the upper end and the lower end of the flexible display screen is 1-8 cm. Preferably, the preset values is one of numeric values 1 km, 2 km, 3 km, or the like.

When the electronic device 100 is in the wearable mode, the flexible display screen 110 may also display application icons in the smartphone mode, that is, in addition to the foregoing icon of the pedometer, the heart rate meter, or the like, the flexible display screen may display icons such as phone, information, and reminders.

Optionally, as described above, a first profile is used when the electronic device is in the smartphone mode, and a second profile is used when the electronic device is in the wearable mode. In the second profile, all notification manners of the electronic device are mute or vibration, and a user may quickly achieve a mute or vibration effect by bending the electronic device.

Optionally, when the electronic device switches to the wearable mode, a function interface of a specific application is displayed on the flexible display screen, where the specific application includes at least one or any combination of the clock, pedometer, heart rate meter, health, reminders, information, phone, or altitude table. For example, the flexible display screen may display information such as time, a current count of steps, a numeric value of a heart rate, an SMS message, content of WeChat, and an unread phone number. In the wearable mode, applications frequently used on the wearable device may be directly displayed, and tap operations of the user are reduced. For example, when an application frequently used by the user is the pedometer, the user may bend the electronic device to switch from the smartphone mode to the wearable mode, and display the current count of steps on the display screen, but skip a process of displaying a pedometer icon.

Optionally, when the electronic device switches to the wearable mode, the electronic device performs a specific operation on an application that currently runs, and the specific operation includes adjusting volume or closing the application. For example, when the user watches a movie by using a player application in the smartphone mode, the user may switch the electronic device from the smartphone mode to the wearable mode by bending. In the wearable mode, the player application is closed or is changed to a mute mode.

Optionally, when the electronic device switches to the wearable mode, the electronic device closes one or more application programs that are already started in the smartphone mode, where the application programs may be programs that run on a foreground or a background. By closing unrelated application programs, the electronic device in the wearable mode may have a longer standby time.

Optionally, when the electronic device switches to the wearable mode, the electronic device starts one or more application programs that are frequently used by the user in the wearable mode.

A rear side of the screen of the flexible display screen 110 described in the present invention is a side far away from the user. Correspondingly, a front side of the screen is a side facing the user. When the flexible display screen 110 can perform displaying on both sides, the pedometer icon shown in FIG. 5 is displayed on the side facing the user.

FIG. 6(a) to FIG. 6(d) show how information displayed on the flexible display screen 110 changes when the flexible display screen 110 switches to the wearable mode.

Figure 6A:
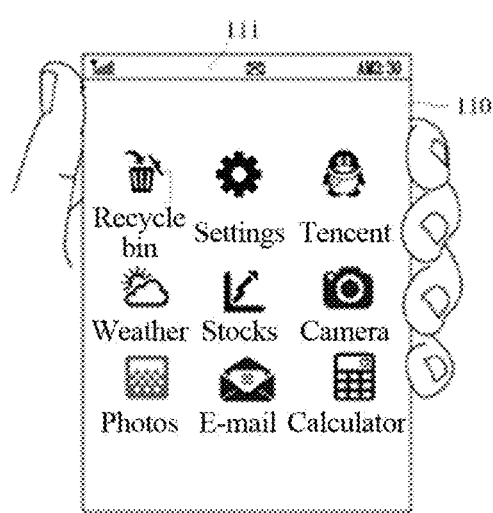
FIG. 6(a) is a schematic diagram for displaying n application icons in a smartphone mode according to an embodiment of the present invention.

As shown in FIG. 6(a), icons of n (n is an integer greater than 1) applications are displayed on the flexible display screen 110 that is not bent, including a recycle bin, settings, Tencent, weather, stocks, a camera, photos, e-mail, and a calculator. In this embodiment, n is 9. The nine applications include first-priority applications (Tencent, camera, and e-mail), second-priority applications (settings and calculator), third-priority applications (weather and stocks), a fourth-priority application (photos), and a fifth-priority application (recycle bin).

There is a status bar display area 111 at the top of the flexible display screen 110. The status bar display area 111 is configured to display signal strength, an unread SMS message, and time.

Figure 6B:
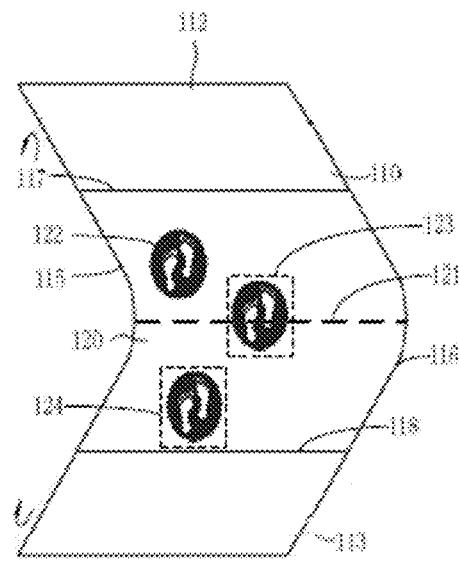
FIG. 6(b) is a schematic diagram for displaying m application icons in a wearable mode according to an embodiment of the present invention.

As shown in FIG. 6(b), the flexible display screen 110 has an upper end 112 and a lower end 113. As described above, the upper end 112 is far away from the ground. When the measurement unit 103 (referring to FIG. 1) detects that the flexible display screen 110 is bent in a manner in which the central area protrudes, and that the distance between the upper end 112 and the lower end 113 is less than the preset value, the electronic device switches to the wearable mode, and a specified area 120 of the flexible display screen displays a pedometer application icon 122. The specified area 120 is a part of the flexible display screen 110. The specified area 120 has an upper edge 117, a lower edge 118, a left edge 115, and a right edge 116. The upper edge 117 and the lower edge 118 are separated by a predetermined distance. A bending line 121 is located between the upper edge 117 and the lower edge 118, and distances from the upper edge and the lower edge to the bending line are equal. The left edge and the right edge are left and right boundaries of the flexible display screen.

The upper edge 117 and the lower edge 118 of the preset area 120 are separated by the predetermined distance. The predetermined distance may be preset according to a requirement, or may be changed by the user in a use process.

As shown in FIG. 6(b), the left and right edges are left and right boundaries of the smartphone respectively. In this case, the smartphone is in vertical orientation, that is, two long sides of the smartphone are left and right boundaries. Optionally, the smartphone may also be in landscape orientation, and in this case, two short edges of the smartphone are used as left and right boundaries of the specified area 120.

Optionally, areas other than the preset area 120 are closed or brightness of other areas is reduced to reduce power consumption and prolong a battery life.

After the preset area 120 is determined, the processor determines content displayed in the preset area 120. The displayed content may be an image or the application icon 122 or the like. As shown in FIG. 6(b), the pedometer application icon 122 is displayed in the preset area 120.

A location of the application icon 122 in the preset area 120 may be adjusted according to a requirement. Optionally, the application icon 122 is located in a center (that is, located on the bending line 121) of the preset area 120; or the application icon 123 may be located on an upper side of the preset area 120 (that is, located between the bending line 121 and the upper edge 117); or the application icon 124 may be located on a lower side of the preset area 120 (that is, located between the bending line 121 and the lower edge 118).

As shown in FIG. 6(b), the application icon 122 is displayed in the preset area 120. Optionally, a quantity of application icons displayed in the preset area 120 is m, where m is an integer not greater than n. For example, in addition to the pedometer application icon 122, a clock application icon, a heart rate meter application icon, or the like may be displayed.

Figure 6C:
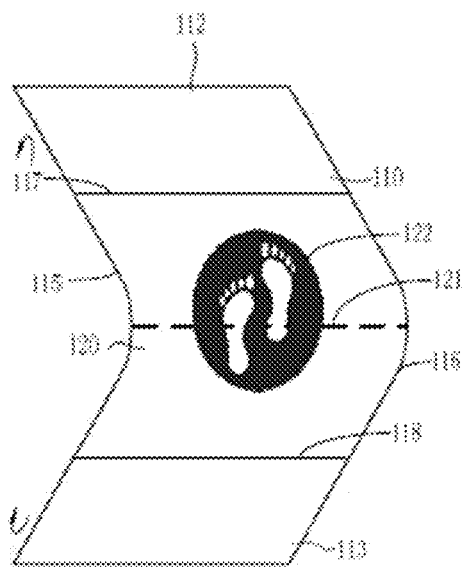
FIG. 6(c) is a schematic diagram for zooming in an application icon in a wearable mode according to an embodiment of the present invention.

An application icon displayed in the preset area 120 may be zoomed in or zoomed out according to a size of the preset area 120 and a quantity of application icons to be displayed. As shown in FIG. 6(c), when the size of the preset area 120 is large, the application icon 122 is zoomed in, so that the size of the icon adapts to the size of the preset area, and further that the icon is clearer and more visible.

Optionally, the size of the application icon displayed in the preset area 120 is less than the size of the application icon in the smartphone mode. For example, a size of an application icon such as the recycle bin shown in FIG. 6(a) may be 1 cm*1 cm, and the size of the application icon 122 may be zoomed out to 0.8 cm*0.8 cm.

Optionally, the application icons displayed in the preset area 120 have different sizes. For example, the pedometer application icon and the heart rate meter application icon may be displayed in the preset area 120, where the pedometer is an application frequently used by the user, a size of the pedometer icon is 0.8 cm*0.8 cm, and a size of the heart rate meter icon is 0.6 cm*0.6 cm. Because the application frequently used by the user has a larger icon size, the user can perform accurate tapping conveniently.

In another case, the pedometer application icon and the heart rate meter application icon may be displayed in the preset area 120, a size of the pedometer icon is 1.2 cm*1.2 cm, and a size of the heart rate meter icon is 0.6 cm*0.6 cm. A difference between sizes of different application icons is increased, so that whether an application is a frequently used application may be distinguished obviously. In this case, the size of the pedometer icon is greater than the size of the application icon in the smartphone mode.

Figure 6D:
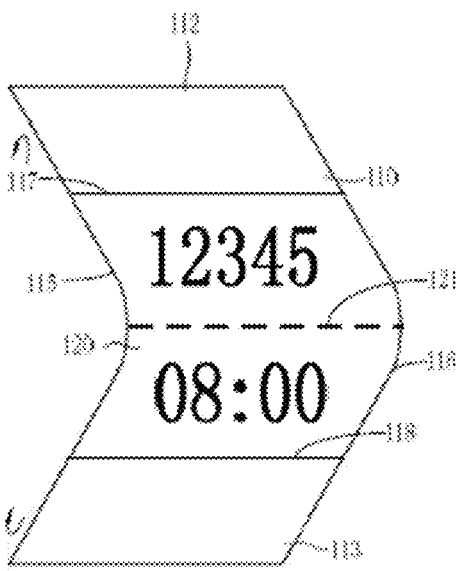
FIG. 6(d) is a schematic diagram for displaying a function interface of an application in a wearable mode according to an embodiment of the present invention.

As shown in FIG. 6(d), content displayed in the preset area 120 may also be a function interface of an application. For example, on the upper side of the preset area 120, a function interface of the pedometer application is displayed, and a count 12345 of steps that the user has walked currently is displayed on the function interface. In addition, on the lower side of the preset area 120, a function interface of the clock application may also be displayed, and current time 08:00 is displayed on the function interface.

In another case, the electronic device 100 in a locked screen state has unread information. The electronic device 100 may be switched to the wearable mode to directly display content of the unread information in the preset area 120. The unread information includes but is not limited to a missed call, an unread SMS message, unread WeChat, or the like. For example, the user may bend the electronic device 100, so that the electronic device 100 displays a phone number of a missed call in the preset area 120.

The icons of m applications displayed in the preset area 120 may have a same priority or different priorities. The priorities of the m applications are higher than priorities of applications that are not displayed, that is, applications frequently used by the user are displayed preferentially.

Optionally, if a priority of an application in the icons of the m applications is higher, an icon of the application is larger. Therefore, an order of application priorities may be reflected visually by the sizes of the application icons. This is more helpful for the user to tap an application of a highest priority, and a misoperation caused by a small icon size is prevented.

The foregoing specific content and quantity of applications displayed on the flexible display screen 110 are described only as examples. The foregoing applications may be various applications used on the electronic device installed with iOS®, Android®, Microsoft®, or another operating system, including but not limited to the phone, SMS, browser, camera, clock, calendar, weather, settings, music, file management, stocks, WeChat, microblog, Tencent, map, e-mail, photos, recycle bin, application store, calculator, news, game, pedometer, heart rate meter, and the like.

The foregoing applications may be classified into a first-priority application, a second-priority application, . . . , an $X^{th}$-priority application according to different priorities. The priorities are determined by the user in advance or are determined by the processor according to frequency of using the applications by the user. For example, in some cases, the user may preset basic function applications (options such as SMS, phone, clock, and settings) to a first priority (highest priority), social applications (such as e-mail, WeChat, microblog, and Tencent) to a second priority, news applications (such as Netease news and Sohu news) to a third priority, game or video applications to a fourth priority, and shopping applications (Taobao, Jingdong Mall, and the like) or online banking applications to a fifth priority.

The priorities may also be determined by the processor 180 according to the frequency of using the applications by the user. For example, if applications most frequently used by the user are music, camera, and pedometer, music, camera, and pedometer may be set to the first priority (highest priority). When the measurement unit 103 detects that the flexible display screen 110 is bent, icons of the first-priority applications are displayed in the preset area of the flexible display screen. Likewise, specific content and a quantity of first-priority applications are described only as examples. The specific content and/or the quantity of first-priority applications are/is not limited.

In a preferred embodiment, when the flexible display screen 110 is bent by external force into a smart band that may be worn on a wrist of the user, first-priority applications displayed in the preset area are the pedometer, heart rate meter, music, and phone.

The flexible display screen 110 before and after the bending may use different profiles to quickly adapt to a change of an application form of the flexible display screen 110. For example, when the flexible display screen 110 works in the smartphone mode, the first profile is used. In the first profile, an incoming call notification uses a ringtone 1 of first volume, a new SMS message uses a ringtone 2 of second volume, and an alert tone uses a ringtone 3 of third volume. When the flexible display screen 110 is in the wearable mode, that is, when the flexible display screen displays icons of m applications in the preset area, an incoming call notification uses vibration 1 of first vibration strength, a new SMS message uses vibration 2 of second vibration strength, and an alert tone uses vibration 3 of third vibration strength. Therefore, when the user participates in a conference, the user may bend the flexible display screen so that the flexible display screen works in the wearable mode, and may quickly switch the profile of the flexible display screen to avoid interference in the conference.

FIG. 6 shows a case in which the entire flexible display screen 110 is bent by external force. In some cases, the flexible display screen 110 may also be folded. With reference to the accompanying drawings, the following describes in detail how information displayed on the flexible display screen 110 is changed when the flexible display screen 110 is folded.

FIG. 7 shows how information displayed on the flexible display screen 110 is changed when the measurement unit 103 senses folding of the flexible display screen 110.

Figure 7A:
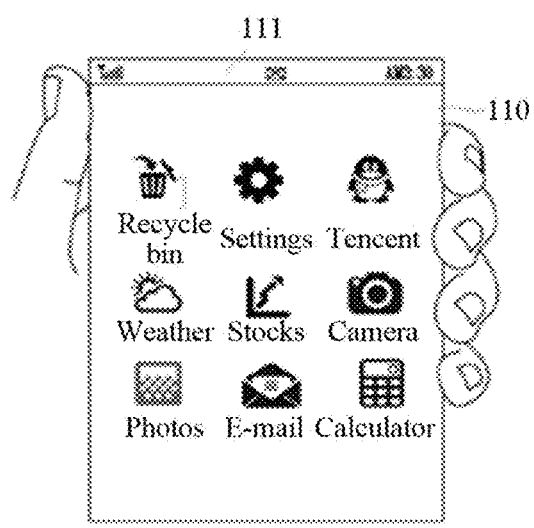
FIG. 7(a) is a schematic diagram for displaying n application icons in a smartphone mode according to an embodiment of the present invention.

As shown in FIG. 7(a), when there is no external force, icons of n applications are also displayed on the flexible display screen 110 that is not folded. Content displayed on the flexible display screen 110 is the same as that in FIG. 6(a), and is not further described in detail herein.

When the measurement unit 103 (referring to FIG. 1) detects that the flexible display screen 110 is folded, the flexible display screen is divided into different display areas according to a location of a bending line 121, that is, an area above the bending line and an area below the bending line.

Figure 7B:
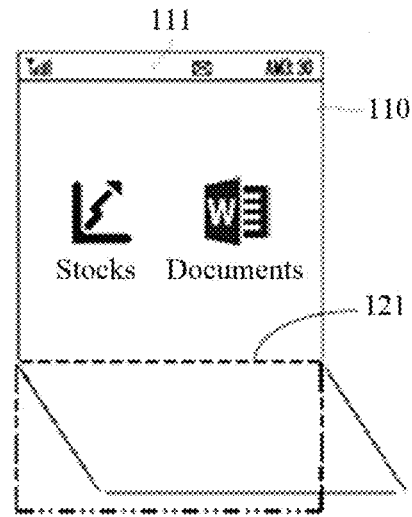
FIG. 7(b) is a schematic diagram for displaying m application icons when a flexible display screen is folded according to an embodiment of the present invention.

As shown in FIG. 7(b), icons of m applications are displayed in the area above the bending line 121.

In a preferred embodiment, when the flexible display screen 110 is folded by external force into a shape similar to a shape of a notebook computer, first-priority applications are displayed in the area above the bending line 121, and the first-priority applications are stocks and documents.

Specific content and a quantity of first-priority applications (stocks and documents) shown in FIG. 7(b) are described only as examples. The specific content and/or the quantity of first-priority applications are/is not limited.

An icon of an application may be zoomed in or zoomed out, and a size of the application icon reflects a priority. This is the same as the foregoing description.

The flexible display screen before and after the folding may use different profiles to quickly adapt to a change of an application form of the flexible display screen. This is the same as the foregoing description.

When the flexible display screen is folded, the processor may detect whether a user input unit has input information. When there is input information, as shown in FIG. 7(c), content is displayed in the area above the bending line 121, and touch interaction information used for controlling content is displayed in the area below the bending line 121.

The content is main data displayed when each application is executed. For example, in a case of a web browser application, content may be web data. In a case of a movie, content may be image data. In a case of word processing, content may be document data. In a case of a game, content may be a game execution screen. In a case of camera photographing, content may be a photographed image. The touch interaction information may be various manners of generating a touch event, for example, a button and a keyboard used for selecting, changing, and moving the foregoing content.

Figure 7C:
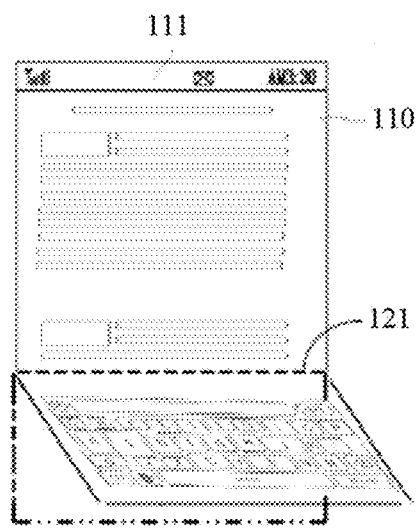
FIG. 7(c) is a schematic diagram for displaying content and touch interaction information when a flexible display screen is folded according to an embodiment of the present invention.

In an example of an embodiment, as shown in FIG. 7(c), when there is input information, document data is displayed in the area above the bending line 121, and a virtual keyboard for editing the document data is displayed in the area below the bending line 121.

When the processor detects that the user input unit has no input information, a main menu is displayed in the area above the bending line 121, and an interface of an application program or a file is displayed in the area below the bending line 121.

Optionally, when there is no input information, an interface of an application program or a file is displayed in the area above the bending line 121, and an upper-level or a lower-level interface of the application program or the file is displayed in the area below the bending line 121.

The main menu may also be referred to as a home screen (home screen), and is a presentation list integrating several application programs and files. The main menu is also used as an access entry of the application program and the file. In some operating systems, the main menu may also exist as an independent application program.

Obviously, the content or the main menu displayed in the area above the bending line 121 may be displayed in the area below the bending line 121. Likewise, the touch interaction information or the interface of the application program or the file displayed in the area below the bending line 121 may also be displayed in the area above the bending line 121, that is, the two areas for displaying the content may be interchanged.

Method steps described in combination with the content disclosed in the present invention may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method, applied to an electronic device having a flexible display screen, the method comprising:

displaying first icons that correspond to first applications on the flexible display screen when the electronic device is in a smartphone mode;

measuring a distance between an upper end of the flexible display screen and a lower end of the flexible display screen;

switching the electronic device from the smartphone mode to a wearable mode when the distance between the upper end of the flexible display screen and the lower end of the flexible display screen is less than a preset value, wherein switching from the smartphone mode to the wearable mode comprises:

closing at least a portion of the first applications corresponding to the first icons displayed in the smartphone mode and starting second applications that are frequently used in the wearable mode, wherein each of the first applications has a priority, and wherein the priorities of the first applications that are closed are lower than the priorities of the first applications that are not closed; and changing the electronic device from using a first profile in the smartphone mode to using a second profile in the wearable mode, wherein the first profile and the second profile comprise different notification settings for different applications, wherein the different notification settings comprise an audio setting and a vibration setting, wherein the first profile comprises an incoming call notification using a first ringtone of a first volume, a new short message service (SMS) message using a second ringtone of a second volume, and an alert tone using a third ringtone of a third volume, and wherein the second profile comprises the incoming call notification using a first vibration of a first vibration strength, the new SMS message using a second vibration of a second vibration strength, and the alert tone using a third vibration of a third vibration strength; and displaying second icons that correspond to the second applications and at least two of the first icons that correspond to at least two of the first applications in a specified area of the flexible display screen when the electronic device is in the wearable mode, wherein the second icons comprise a fewer number of icons than the first icons, wherein a size difference between the at least two of the first icons is increased when switching the electronic device from the smartphone mode to the wearable mode, wherein a first size of a first one of the first icons that corresponds to one of the first applications that is used more frequently is displayed larger than a second size of a second one of the first icons that corresponds to another one of the first applications that is used less frequently, wherein the specified area is a part of the flexible display screen, wherein the specified area has an upper edge, a lower edge, a left edge, and a right edge, wherein the upper edge is separated from the lower edge by a predetermined distance, wherein a bending line is located between the upper edge and the lower edge, wherein distances from the upper edge and the lower edge to the bending line are equal, wherein the left edge and the right edge are a left boundary and a right boundary of the flexible display screen respectively, and wherein the bending line is a line coupling points at which maximum bending occurs in a bending area.

2. The method of claim 1, wherein areas other than the specified area on the flexible display screen are closed when the electronic device switches to the wearable mode.

3. The method of claim 1, further comprising adjusting volume of one of the first applications that currently runs when the electronic device switches to the wearable mode.

4. The method of claim 1, further comprising displaying a function interface of one of the second applications when the electronic device switches to the wearable mode.

5. The method of claim 4, wherein the one of the second applications comprises a clock, a pedometer, or a heart rate meter.

6. The method of claim 1, further comprising changing to a mute mode when the electronic device switches to the wearable mode.

7. The method of claim 1, wherein the preset value comprises the distance between the upper end of the flexible display screen and the lower end of the flexible display screen being within a range of one to eight centimeters.

8. The method of claim 1, wherein the first size comprises a first width and a first height, wherein the second size comprises a second width and a second height, wherein the first width is greater than the second width, wherein the first height is greater than the second height, wherein the first width is 100% greater than the second width, and wherein the first height is 100% greater than the second height.

9. The method of claim 1, wherein the first size comprises a first area, wherein the second size comprises a second area, and wherein the first area is 400% greater than the second area.

10. The method of claim 1, wherein the first one of the first icons comprises a first square, and wherein the second one of the first icons comprises a second square.

11. The method of claim 1, wherein the first one of the first icons comprises a pedometer icon, and wherein the second one of the first icons comprises a heart rate meter application icon.

12. An electronic device having a flexible display screen, comprising:

a memory comprising instructions; and a processor coupled to the memory, wherein the instructions are executed by the processor to cause the electronic device to be configured to:

display first icons that correspond to first applications on the flexible display screen when the electronic device is in a smartphone mode;

measure a distance between an upper end of the flexible display screen and a lower end of the flexible display screen;

switch the electronic device from the smartphone mode to a wearable mode when the distance between the upper end of the flexible display screen and the lower end of the flexible display screen is less than a preset value, wherein switching from the smartphone mode to the wearable mode comprises:

closing at least a portion of the first applications corresponding to the first icons displayed in the smartphone mode and starting second applications that are frequently used in the wearable mode, wherein each of the first applications has a priority, and wherein the priorities of the first applications that are closed are lower than the priorities of the first applications that are not closed; and changing the electronic device from using a first profile in the smartphone mode to using a second profile in the wearable mode, wherein the first profile and the second profile comprise different notification settings for different applications, wherein the different notification settings comprise an audio setting and a vibration setting, wherein the first profile comprises an incoming call notification using a first ringtone of a first volume, a new short message service (SMS) message using a second ringtone of a second volume, and an alert tone using a third ringtone of a third volume, and wherein the second profile comprises the incoming call notification using a first vibration of a first vibration strength, the new SMS message using a second vibration of a second vibration strength, and the alert tone using a third vibration of a third vibration strength; and display second icons that correspond to the second applications and at least two of the first icons that correspond to at least two of the first applications in a specified area of the flexible display screen when the electronic device is in the wearable mode, wherein the second icons comprise a fewer number of icons than the first icons, wherein a size difference between the at least two of the first icons is increased when switching the electronic device from the smartphone mode to the wearable mode, wherein a first size of a first one of the first icons that corresponds to one of the first applications that is used more frequently is displayed larger than a second size of a second one of the first icons that corresponds to another one of the first applications that is used less frequently, wherein the specified area is a part of the flexible display screen, wherein the specified area has an upper edge, a lower edge, a left edge, and a right edge, wherein the upper edge is separated from the lower edge by a predetermined distance, wherein a bending line is located between the upper edge and the lower edge, wherein distances from the upper edge and the lower edge to the bending line are equal, wherein the left edge and the right edge are a left boundary and a right boundary of the flexible display screen respectively, and wherein the bending line is a line coupling points at which maximum bending occurs in a bending area.

13. The electronic device of claim 12, wherein areas other than the specified area on the flexible display screen are closed when the electronic device switches to the wearable mode.

14. The electronic device of claim 12, wherein the instructions are further executed by the processor to cause the electronic device to adjust volume of one of the first applications that currently runs when the electronic device switches to the wearable mode.

15. The electronic device of claim 12, wherein the instructions are further executed by the processor to cause the electronic device to display a function interface of one of the second applications when the electronic device switches to the wearable mode.

16. The electronic device of claim 15, wherein the one of the second applications comprises a clock, a pedometer, or a heart rate meter.

17. The electronic device of claim 12, wherein the instructions are further executed by the processor to cause the electronic device to change to a mute mode when the electronic device switches to the wearable mode.

18. The electronic device of claim 12, wherein the preset value comprises the distance between the upper end of the flexible display screen and the lower end of the flexible display screen being within a range of one to eight centimeters.

19. A computer program product comprising computer-executable instructions stored on a non-transitory computer-readable medium that, when executed by a processor, cause an electronic device to:

display first icons that correspond to first applications on a flexible display screen when the electronic device is in a smartphone mode;

measure a distance between an upper end of the flexible display screen and a lower end of the flexible display screen;

switch the electronic device from the smartphone mode to a wearable mode when the distance between the upper end of the flexible display screen and the lower end of the flexible display screen is less than a preset value, wherein switching from the smartphone mode to the wearable mode comprises:

closing at least a portion of the first applications corresponding to the first icons displayed in the smartphone mode and starting second applications that are frequently used in the wearable mode, wherein each of the first applications has a priority, and wherein the priorities of the first applications that are closed are lower than the priorities of the first applications that are not closed; and changing the electronic device from using a first profile in the smartphone mode to using a second profile in the wearable mode, wherein the first profile and the second profile comprise different notification settings for different applications, wherein the different notification settings comprise an audio setting and a vibration setting, wherein the first profile comprises an incoming call notification using a first ringtone of a first volume, a new short message service (SMS) message using a second ringtone of a second volume, and an alert tone using a third ringtone of a third volume, and wherein the second profile comprises the incoming call notification using a first vibration of a first vibration strength, the new SMS message using a second vibration of a second vibration strength, and the alert tone using a third vibration of a third vibration strength; and display second icons that correspond to the second applications and at least two of the first icons that correspond to at least two of the first applications in a specified area of the flexible display screen when the electronic device is in the wearable mode, wherein the second icons comprise a fewer number of icons than the first icons, wherein a size difference between the at least two of the first icons is increased when switching the electronic device from the smartphone mode to the wearable mode, wherein a first size of a first one of the first icons that corresponds to one of the first applications that is used more frequently is displayed larger than a second size of a second one of the first icons that corresponds to another one of the first applications that is used less frequently, wherein the specified area is a part of the flexible display screen, wherein the specified area has an upper edge, a lower edge, a left edge, and a right edge, wherein the upper edge is separated from the lower edge by a predetermined distance, wherein a bending line is located between the upper edge and the lower edge, wherein distances from the upper edge and the lower edge to the bending line are equal, wherein the left edge and the right edge are a left boundary and a right boundary of the flexible display screen respectively, and wherein the bending line is a line coupling points at which maximum bending occurs in a bending area.

* * * * *